United States Patent
Ray et al.

(10) Patent No.: US 9,691,075 B1
(45) Date of Patent: Jun. 27, 2017

(54) NAME COMPARISON

(71) Applicant: Wal-Mart Stores, Inc., Bentonville, AR (US)

(72) Inventors: Andrew Benjamin Ray, Bentonville, AR (US); Nathaniel Philip Troutman, Seattle, WA (US)

(73) Assignee: WAL-MART STORES, INC., Bentonville, AR (US)

( * ) Notice: Subject to any disclaimer, the term of this patent is extended or adjusted under 35 U.S.C. 154(b) by 221 days.

(21) Appl. No.: 14/214,368

(22) Filed: Mar. 14, 2014

(51) Int. Cl.
G06F 17/30 (2006.01)
G06F 17/00 (2006.01)
G06Q 30/02 (2012.01)

(52) U.S. Cl.
CPC .................... G06Q 30/0201 (2013.01)

(58) Field of Classification Search
CPC ............ G06F 17/278; G06F 17/30887; G06F 17/2223; G06F 17/30675; G06F 17/30864; G06F 15/17306; G06F 17/2755; G06F 17/30; G06F 17/30876; G06F 11/1417; G06F 17/2705; G06F 17/273; G06F 17/2765; G06F 17/28; G06F 17/2818; G06F 17/289; G06F 17/30; G06F 17/00
See application file for complete search history.

(56) References Cited

U.S. PATENT DOCUMENTS

| | | | |
|---|---|---|---|
| 5,819,265 A | 10/1998 | Ravin |
| 5,832,480 A | 11/1998 | Byrd |
| 7,251,625 B2 | 7/2007 | Anglum |
| 7,672,833 B2 | 3/2010 | Blume |
| 8,234,107 B2 | 7/2012 | Goyal |
| 8,352,496 B2 | 1/2013 | Johnston |
| 8,364,692 B1 | 1/2013 | Allen |
| 8,402,032 B1 | 3/2013 | Brunsman |
| 8,484,148 B2 | 7/2013 | Johnston |
| 8,533,203 B2 | 9/2013 | Chaudhuri |

Primary Examiner — Yicun Wu
(74) Attorney, Agent, or Firm — Patterson Thuente Pedersen, P.A.

(57) ABSTRACT

The present disclosure extends to comparing two or more names in a database of contact records. In embodiments, systems of the present disclosure execute a comparison of submitted names to determine if the records should be linked and/or merged. Embodiments of the present disclosure can compensate for irregularities in the database of contact records, including inconsistent name prefixes and suffixes, misspellings, typographical errors, misordered first/last names, and nicknames.

20 Claims, 4 Drawing Sheets

NAME COMPARISON

BACKGROUND

Enterprises often maintain a record of people and/or entities of interest. For example, a commercial retail establishment may typically use databases of customers, vendors, and/or employees. A nonprofit organization may utilize a database of donors and potential donors. Sales offices may maintain a list of potential customers. Many other scenarios are conceivable where a database of people and/or entities could be useful and desirable. In the present disclosure, such a database may be referred to as a "contact database." Entries in a contact database may be referred to herein as a "contact" or a "contact record."

Records in a contact database may include the name of the contact, address, telephone number, email address, and other useful information about the contact. Such information in a contact database may be selected based on the specific needs and uses that the enterprise anticipates for the contact database.

A current problem with some contact databases may be duplicate records. A large database can typically have multiple sources for its data. For example, a retail establishment may collect customer names from a variety of sources, including credit card information, rewards membership, customer website accounts, club membership, gift registries, layaway programs, and ancillary services offered, such as oil/lube auto shops. As a result, the data for a specific person or entity can be entered more than once into different contact records. Some contact databases may currently have the ability to identify two or more contact records that bear the same name, therefore indicating the same person or entity, and then carry out a record linkage and/or merge the two contacts into a single record.

However, comparing names of contacts may be problematic for many contacts for several reasons: First, a person's given, middle, and last names can be entered into a contact record in a variety of sequences, thus leading to inconsistent records. Second, when filling out forms, some people often provide nicknames, but may be inconsistent with nickname usage in other forms. Third, suffixes and prefixes, such as "Jr." or "Dr." may be used with inconsistent spelling or placement. Fourth, typographical errors in data entry may result in two contact records having different spellings of the same name.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
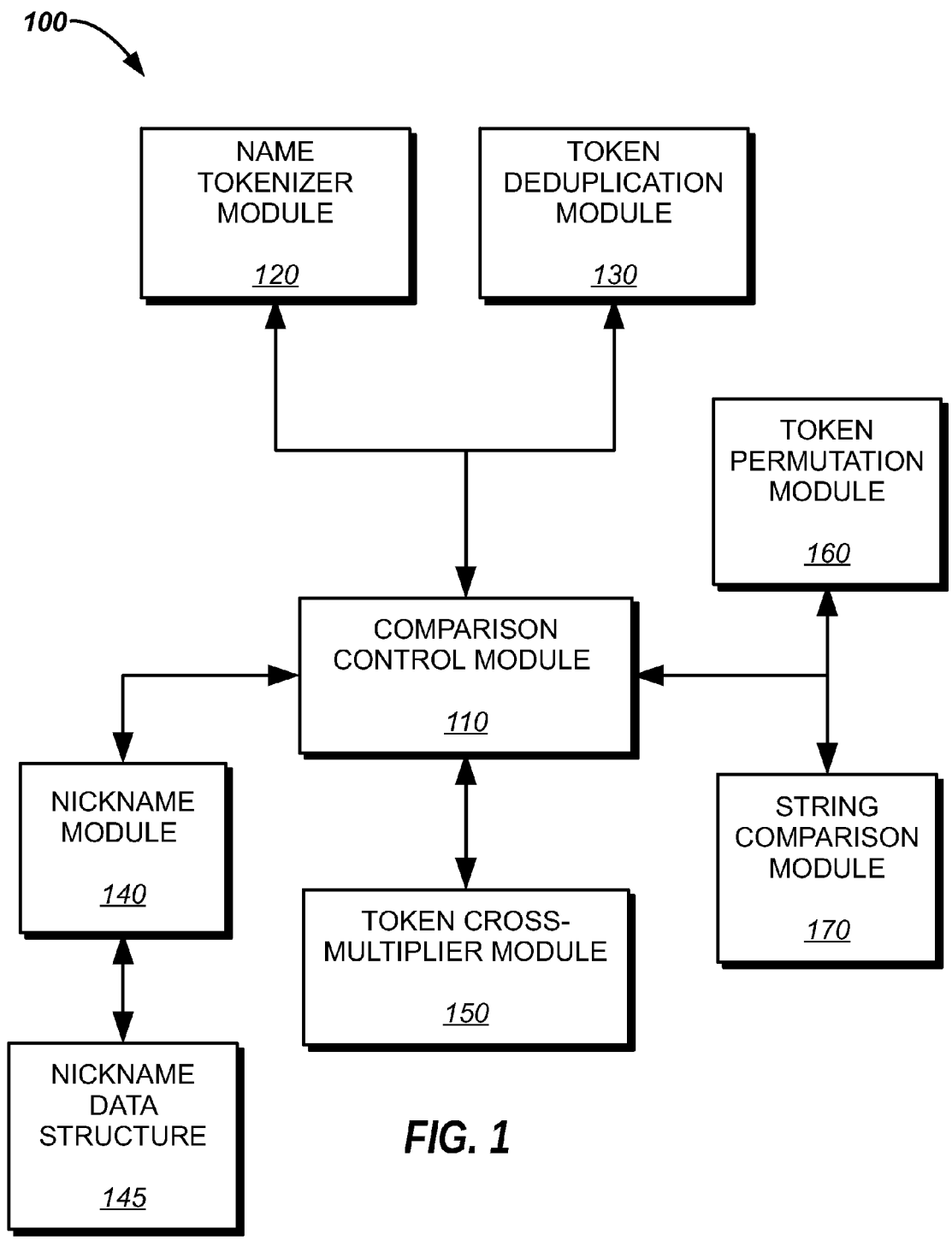
FIG. 1 is a block diagram illustrating components of a name comparison system according to an embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The present disclosure is directed to methods, systems, and computer programs for comparing contact record names in a database. In the following description, reference is made to the accompanying drawings that form a part hereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages.

Such code may be compiled from source code to computer-readable assembly language or machine code suitable for the device or computer on which the code will be executed Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flowcharts and block diagram in the attached figures illustrate the architecture, functionality, and operation of possible implementations of systems, methods, and computer program products according to various embodiments of the present disclosure. In this regard, each block in the flowcharts or block diagram may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagram block or blocks.

Embodiments of the present disclosure are directed to comparing two or more names in a database of contact records. In an embodiment, a contact database comprises numerous contact records, each record being associated with a person or entity. In some cases, two or more contact records may refer to the same person or entity but store contact names in inconsistent forms, with varying spellings of names, and/or various nicknames. Embodiments of the present disclosure can link such related records together by carrying out a name comparison operation as disclosed herein. Embodiments of the present disclosure comprise operations that make up a part of a decision tree.

Referring now to FIG. 1, embodiments of name comparison system 100 of the present disclosure comprises comparison control module 110, name tokenizer module 120, token deduplication module 130, nickname module 140, token cross-multiplier module 150, token permutation module 160, and string comparison module 170. In embodiments, comparison control module 110, name tokenizer module 120, token deduplication module 130, nickname module 140, token cross-multiplier module 150, token permutation module 160, and/or string comparison module 170 are implemented as computer-readable instructions and/or data stored in a memory to direct a computer processor to carry out operations as described herein.

In an embodiment, comparison control module 110 comprises a computer processor and operational memory that includes data and/or computer-readable instructions to direct comparison control module 110 to receive two names for comparison and execute steps of the operations disclosed herein to determine if the names may belong to the same person or entity and thus if the contact records should be combined or not. In one embodiment, comparison control module 110 can output a name comparison score to an external decision tree process. In embodiments, the name comparison score comprises a number score on a normalized scale. In an embodiment, if the comparison score exceeds a predetermined threshold, then it may be held that the two names should be combined. In another embodiment, a record linkage decision tree process receives the name comparison score from comparison control module 110 and considers the name comparison score in conjunction with other factors to determine if the multiple contact records under consideration should be merged. In embodiments, comparison control module 110 can transmit data and instructions to modules 120, 130, 140, 150, 160, and/or 170 to carry out operations that will be described in further detail.

In one embodiment, name tokenizer module 120 receives from comparison control module 110 a name string, the name string corresponding to the complete name of one of the contact records under comparison by name comparison system 100. In one embodiment, the complete name includes a person's given, middle, and last names. In embodiments, name tokenizer module 120 is implemented in one or more computer processors and an operational memory that includes data and/or computer-readable instructions to direct the computer processor to tokenize the full name by parsing the input name string at the word level into tokens. In an embodiment, name tokenizer module 120 parses the input name string by white space characters. In other embodiments, name tokenizer module 120 additionally parses the input name string by punctuation characters. Upon tokenizing the input name string, name tokenizer module 120 can return a set of tokens back to comparison control module 110. In embodiments, comparison control module 110 serially directs name tokenizer module 120 to tokenize each one of multiple name strings under comparison.

In embodiments, token deduplication module 130 is implemented in one or more computer processors and an operational memory that includes data and/or computer-readable instructions to direct the computer processor to receive two sets of tokens from comparison control module 110 and return the distinct tokens. Each such set of received tokens may correspond to name strings that were previously tokenized by name tokenizer module 120. As used in the present disclosure, a "distinct" token is one that appears in one set of tokens but not the other set of tokens. In an embodiment, token deduplication module 130 can identify any tokens that do not appear in both sets of tokens. For example, a token that appears only in the first set of tokens but not in the second set of tokens can be identified by token deduplication module 130 and returned to comparison control module 110 as a distinct token in the first set of distinct tokens. In embodiments, token deduplication module 130 can identify all distinct tokens in both sets of tokenized name strings. In an embodiment, comparison control module 110 receives a set of distinct tokens from token deduplication module 130 that corresponds to each set of tokens that was received by token deduplication module 130.

In an embodiment, comparison control module 110 can serially transmit each set of distinct tokens (or alternatively, each distinct token separately) to nickname module 140. In embodiments, nickname module 140 is implemented in one or more computer processors and an operational memory that includes data and/or computer-readable instructions to direct the computer processor to identify and return any potential alternate names for any of the tokens input thereto. In embodiments, nickname module 140 identifies nicknames for each token by traversing a data structure 145 containing alternate names for any particular name. In one embodiment, nickname data structure 145 comprises a vantage-point tree comprising names linked to one or more nicknames. In other embodiments, alternative data structures are employed. In one embodiment, nickname module 140 executes a phonetic algorithm to identify alternative spellings for entered tokens. Nickname module 140 can return to comparison control module 110 all known nicknames for each token provided.

In embodiments, comparison control module 110 transmits each set of distinct tokens with associated nicknames to token cross-multiplier module 150 to cross-multiply each group of distinct tokens with their corresponding nicknames. In embodiments, token cross-multiplier module 150 is implemented in one or more computer processors and an operational memory that includes data and/or computer-readable instructions to direct the computer processor to generate all possible combinations of tokens and substituted nicknames. A resulting output from token cross-multiplier module 150 may include all possible combinations of distinct tokens and substituted nicknames and may be referred to herein as a "cross-multiplied set."

In an embodiment, token permutation module 160 receives a cross-multiplied set from comparison control module 110. The cross-multiplied set may represent one of the full names that were input to comparison control module 110. In embodiments, token permutation module 160 is implemented in one or more computer processors and an operational memory that includes data and/or computer-readable instructions to direct the computer processor to carry out cyclic permutation of each cross-multiplied set to result in a number of permutations of the various distinct token and nickname combinations. Each resulting permutation may be concatenated into a string. In an embodiment, all permutated strings are returned as a set to comparison control module 110. In another embodiment, permutated strings are transmitted directly to string comparison module 170 for comparison.

In one embodiment, two sets of permutated strings are input to string comparison module 170. Each set of permutated strings corresponds to the name of one of the contact records under comparison by name comparison system 100. In embodiments, string comparison module 170 is implemented in one or more computer processors and an operational memory that includes data and/or computer-readable instructions to direct the computer processor to compare each permutated string from the first set to a permutated string from the second set using a string metric. In one embodiment, string comparison module 170 compares strings by counting single-character edits, such as by carrying out the Levenshtein distance algorithm. In another embodiment, string comparison module 170 carries out a trigram ratio comparison between each string pair.

String comparison module 170 can determine and store the calculated distance between each permutated string pair. In an embodiment, string comparison module 170 takes the minimum distance of all the calculated distances between all permutations of combinations of tokens. The minimum distance may be interpreted as a final distance between the two names that were initially input into name comparison system 100. String comparison module 170 is adapted to return the final distance to comparison control module 110, which may then output to the decision tree process or other external process that requested the name comparison.

Figure 2:
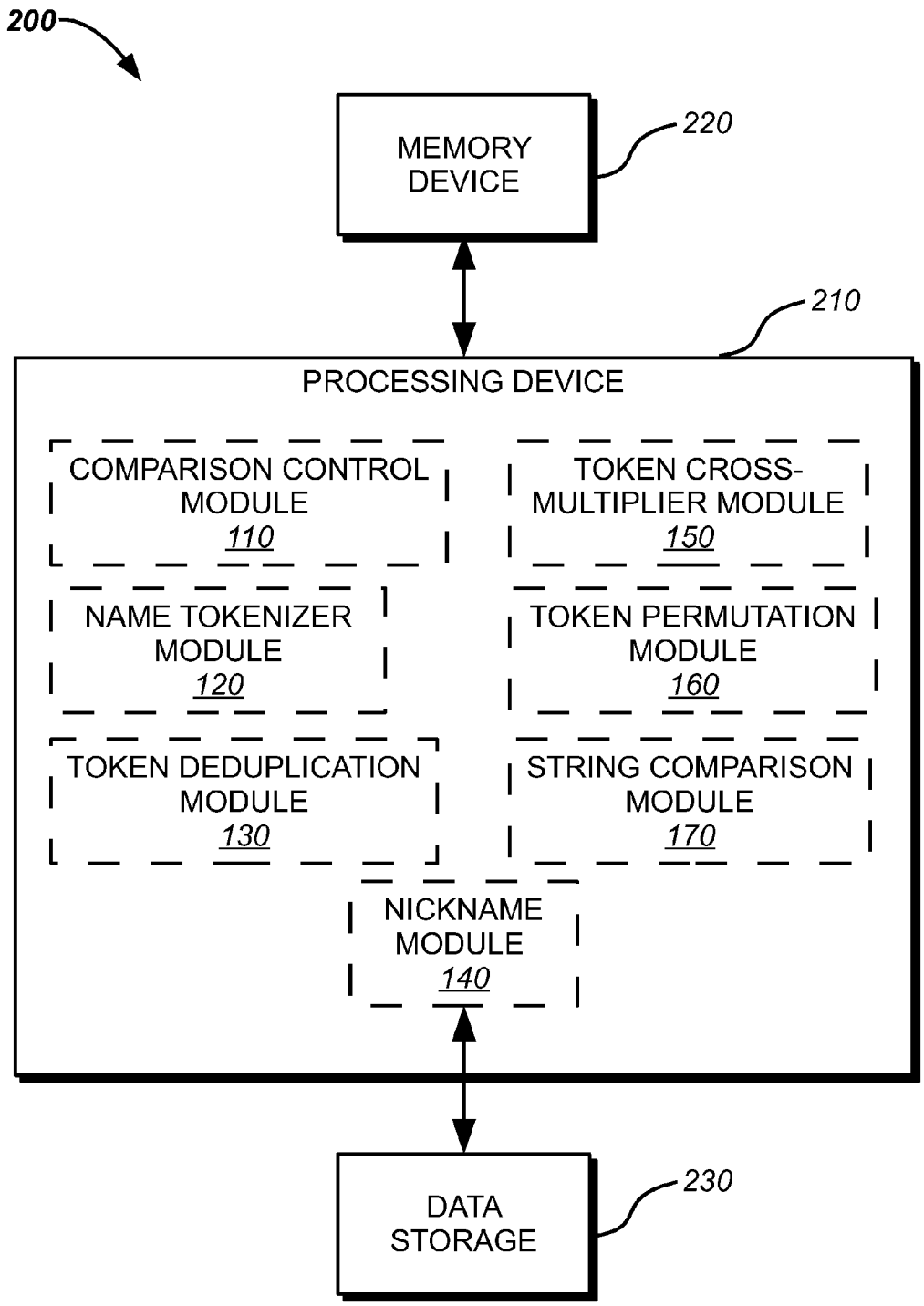
FIG. 2 is a block diagram illustrating a name comparison computing device according to embodiments of the present disclosure.

Referring now to FIG. 2, a name comparison computer system 200 according to embodiments of the present disclosure is depicted. Name comparison computer system 200 comprises processing device 210, memory device 220, and data storage 230. In the embodiment depicted, processing device 210 comprises comparison control module 110, name tokenizer module 120, token deduplication module 130, nickname module 140, token cross-multiplier module 150, token permutation module 160, and string comparison module 170. In an embodiment, data storage 230 comprises nickname data structure 145.

Figure 3:
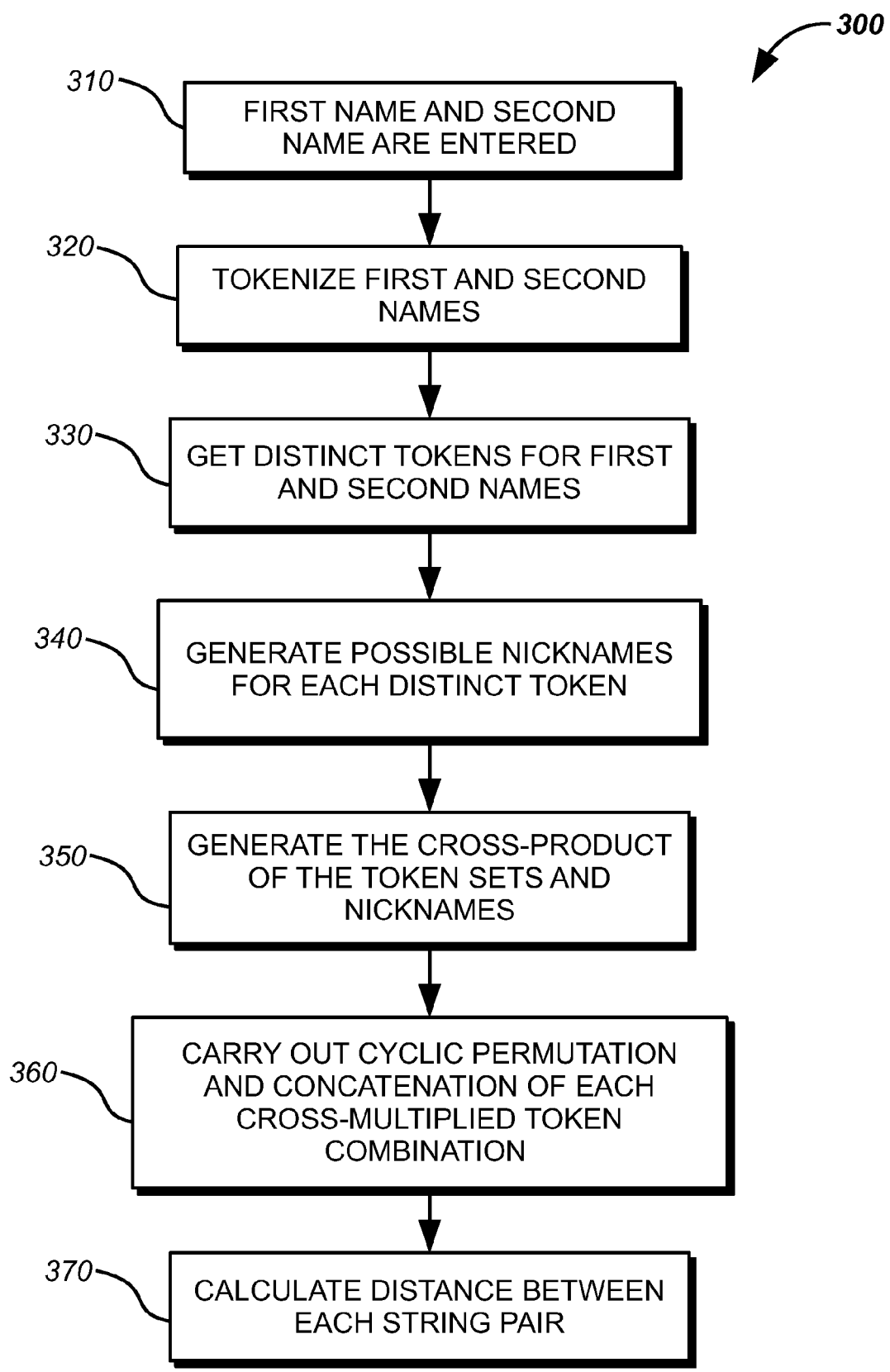
FIG. 3 is a chart illustrating an example method for comparing names in accordance with embodiments of the present disclosure.

In operation, name comparison system 100 receives as input two contact names and performs a comparison of those names to determine if the names should be linked and/or merged. Referring now to FIG. 3, embodiments of the present disclosure comprise a method 300 for comparing names from two contact records to attempt to determine if they represent the same person or entity. At operation 310, comparison control module 110 receives two names for comparison. These names may be referred to herein as the First Name and the Second Name. In embodiments, the First Name and the Second Name each comprise multiple words, such as the given, middle and last names of a person. Each name may further include a prefix and/or a suffix.

At operation 320, name tokenizer module 120 tokenizes the First Name and the Second Name by parsing each name string at the word level into tokens. During operation 320, a set of tokens for each of the First Name and the Second Name are generated by name tokenizer module 120 and returned to comparison control module 110.

At operation 330, token deduplication module 130 receives each set of tokens and identifies the distinct tokens in each set. In other words, token deduplication module 130 compares each token in the First Name set to each token in the Second Name set. If a token appears in both sets, it is designated as a nondistinct token and may be disregarded. If a token appears only in the First Name set and not in the Second Name set, it is added to the First distinct token set. Conversely, if the token appears only in the Second Name set and not in the First Name set, it is added to the Second distinct token set. After thus comparing all tokens in the First Name set with all tokens in the Second Name set, the First distinct token set and Second distinct token set are returned to comparison control module 110.

At operation 340, nickname module 140 receives each distinct token set and identifies possible nicknames for each token in the set. In an embodiment, nickname module 140 selects a token and traverses nickname data structure 145 searching for the selected token. Upon traversing to the token in the nickname data structure 145, nickname module 140 retrieves all nicknames that correspond to the selected token and adds those nicknames to a nickname set for that selected token. All tokens in each distinct token set are thus assigned a list of possible nicknames that correspond to the particular token. In an example, a First distinct token set includes the name "John." After traversing nickname data structure 145, nickname module 140 may identify the nicknames "Jack," "Johnny," and "Johnathan." The identified nicknames are added to a nickname set for the distinct token "John" in the First distinct token set. Other tokens are then similarly selected by nickname module 140 for identification of nicknames, which may then similarly be added to the nickname set for that token. After carrying out similar operations for all tokens in the First distinct token set, nicknames are added to nickname sets for each token in the Second distinct token set. In one embodiment, nickname data structure 145 comprises a vantage-point tree, which nickname module 140 can traverse to identify nicknames for any selected token name. In other embodiments, various data structures may be similarly used.

At operation 350, token cross-multiplier module 150 receives each set of distinct token sets with corresponding nickname sets and generates the cross-product of the token sets and nicknames, thereby resulting in every possible combination of name tokens and nick names substituted for corresponding tokens. In an embodiment, token cross-multiplier module 150 serially carries out operation 350 on the First distinct token set and its respective nick name sets and on the Second distinct token set and its respective nick name sets. The products of operation 350 may be referred to herein as "cross-multiplied sets." A cross-multiplied set generated from the First distinct token set may be referred to herein as the "First cross-multiplied set" and a cross-multiplied set generated from the Second distinct token set may be referred to herein as the "Second cross-multiplied set." Each cross-multiplied set includes one or more cross-multiplied token combinations that were generated during the cross-multiplication operation 350. In an embodiment, a cross-multiplied token combination comprises one of the tokenized names, with a nickname replacing one or more of the corresponding name components (for example, the given, middle, and/or last name).

At operation 360, both the First and Second cross-multiplied sets are input to token permutation module 160. Token permutation module 160 carries out cyclic permutation of each cross-multiplied token combination within each cross-multiplied set to result in a number of permutations of the distinct tokens and nicknames. During one embodiment of operation 360, token permutation module 160 shifts each element of a cross-multiplied token combination back by one and moves the previously-last element to the beginning of the cross-multiplied token combination. Token permutation module 160 then concatenates the elements of each resulting permutation to form a permutated string. Each permutated string from each cycle operating on the First cross-multiplied set may be added to a First permutated set. The token permutation module 160 repeatedly performs cycle permutation shifts and concatenations, and adds the resulting permutated strings to the First permutation set. Permutation cycles are repeated until the cross-multiplied token combination has been cycled. Subsequently, any other cross-multiplied token combinations in the First cross-multiplied set are likewise cycled until all cross-multiplied token combinations have been permutated, concatenated, and added to the First permutation set. Subsequently, the Second permutation set is similarly populated by cyclically permuting and concatenating the cross-multiplied token combinations in the Second cross-multiplied set. In one embodiment, both the First and Second cross-multiplied sets are thus processed to generate First and Second permutation sets.

In other embodiments, only a First cross-multiplied set undergoes cycle permutation to generate a First permutation set, while the Second cross-multiplied set undergoes an operation that simply concatenates each cross-multiplied token combination within the Second cross-multiplied set and adds the resulting strings to a set and repeats the process until all cross-multiplied token combinations within the Second cross-multiplied set have been thus processed and added to the set. Such a resultant set comprising one or more strings may still be referred to herein as a "Second permutation set" even if no permutations were carried out during its generation.

At operation 370, string comparison module 170 calculates the distance between each string within the First permutation set and each string within the Second permutation set. In embodiments, string comparison module 170 calculates each distance by carrying out the Levenshtein distance algorithm. In other embodiments, string comparison module 170 calculates each distance by carrying out a trigram ratio comparison. It is to be understood that other methods of comparing strings can be carried out and fall within the scope of the present disclosure. After string comparison module 170 has compared all strings from the First permutation set against all strings from the Second permutation set, string comparison module 170 assigns a name comparison score to the comparison between the First permutation set and the Second permutation set. In one embodiment, the name comparison score comprises the minimum distance from the set of distances calculated by string comparison module 170. The name comparison score may then be used by comparison control module 110 and/or output to a record-linkage decision tree to determine if the First and Second names belong to the same person or entity and therefore should be linked and/or merged.

In one embodiment, string comparison module 170 is adapted to stop operation 370 if any calculated distance between any string in the First permutation set and any string within the Second permutation set is below a threshold, where a distance below the threshold is indicative of a sufficiently-close match. In other words, as soon as string comparison module 170 has determined that the First Name and the Second Name are sufficiently similar to warrant a match, the comparison operation 370 will cease and a positive match may be confirmed.

In embodiments, a string comparison operation, such as a Levenshtein distance calculation or the like, is initially carried out on the First Name and the Second Name prior to tokenization or other operations. If the string comparison shows that the First Name and the Second Name are sufficiently similar, the comparison process may cease immediately and a positive match may be confirmed.

In embodiments, name comparison system 100 can practice machine learning techniques to determine a name comparison score threshold that may be indicative of matching names. For example, a set of First Name and Second Name pairs that are known to be matching may be processed according to methods of the present disclosure. By analyzing the resultant name comparison scores of the known matches, systems of the present disclosure can learn and implement optimized name comparison score thresholds.

Figure 4:
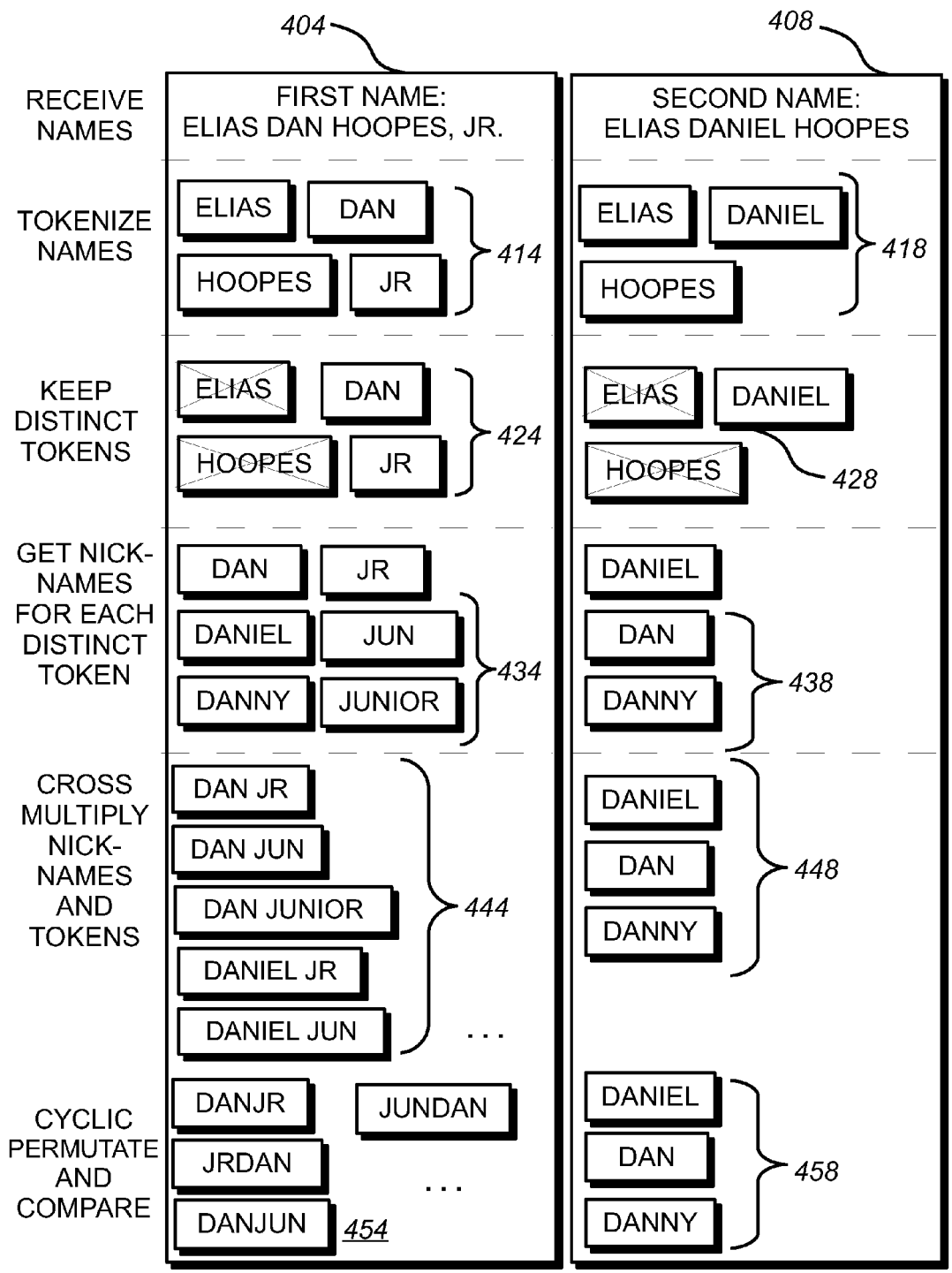
FIG. 4 is a chart depicting an example name comparison process of the present disclosure.

Referring now to FIG. 4, an example execution of a name comparison system 100 according to embodiments of the present disclosure is depicted. In the hypothetical example illustrated, two names 404, 408 are supplied to name comparison system 100. The First Name 405 is "ELIAS DAN HOOPES, JR." and the Second Name 410 is "ELIAS DANIEL HOOPES." Names 404, 408 are then tokenized by separating each word by white space and punctuation characters, resulting in First Name tokens 414 and Second Name tokens 418. From tokens 414, 418, distinct tokens are identified and added to distinct token sets 424, 428. The tokens "ELIAS" and "HOOPES" were determined to be nondistinct tokens because they are present in both the First Name set 414 and Second Name set 418 and are accordingly disregarded. The tokens "DAN" and "JR" were determined to be the First distinct tokens 424. The token "DANIEL" was determined to be the Second distinct token 428.

Each distinct token 424, 428 are queried to nickname data structure, which returns stored nicknames for each name query. In this example, the nicknames "DANIEL" and "DANNY" are returned for the distinct token "DAN" 424 and the nicknames "JUN" and "JUNIOR" are returned for the distinct token "JR" 424. The nicknames "DAN" and "DANNY" are returned for the distinct token "DANIEL" 428. Each distinct token and its nicknames are then cross-multiplied with the other tokens and the nicknames of those other tokens to result in the cross-products 444, 448 representing every combination of the distinct tokens 424, 428 and nicknames 434, 438. In the example depicted, only some of the cross-products 444 are depicted. According to the present disclosure, cross-multiplying the tokens 424 with nicknames 434 results in the following cross-products: "DAN JR," "DAN JUN," "DAN JUNIOR," "DANIEL JR," "DANIEL JUN," "DANIEL JUNIOR," "DANNY JR," "DANNY JUN," and "DANNY JUNIOR." Because only a single distinct token 428 was identified from the Second Name 408, the set of distinct token 428 and nicknames 438 was cross-multiplied with itself, resulting in the cross-product 448 of it.

The cross-products 444, 448 are then cyclically permutated and the elements of each permutation are concatenated. FIG. 4 only depicts some of the possible permutations 454, 458 from cross-products 444, 448. As depicted, the cross product 444 "DAN JR" can be permutated and concatenated to result in "DANJR" and "JRDAN." After all permutations have been concatenated to create sets 454 and 458, each string in set 454 is compared to each string in 458. In an embodiment, the comparison comprises execution of a Levenshtein distance algorithm. In the example depicted in FIG. 4, the strings "DANJR" and "JRDAN" from set 454 will be compared with the string "DAN" from set 458, resulting in a calculated distance of 2. Likewise, the strings "DANIELJR" and "JRDANIEL" from set 454 will be compared with the string "DANIEL" from set 458 and the strings "DANNYJR" and "JRDANNY" from set 454 will be compared with the string "DANNY" from set 458 to result in a distance of 2. In one embodiment, the name comparison score is the minimum from all calculated distances; thus the name comparison score in the present example is 2. In another embodiment, the name comparison score is calculated by averaging or other statistical manipulations of all distance calculation results.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed is:

1. A computer-implemented method of comparing two contact records in a contact database, comprising:
    receiving a first name and a second name;
    at a computer processor of a name tokenizer module, tokenizing the first name, thereby generating a first set of tokens;
    at the computer processor of the name tokenizer module, tokenizing the second name, thereby generating a second set of tokens;
    at a data structure of a nickname module, searching for a first nickname corresponding to a selected token in the first set of tokens;
    at a computer processor of the nickname module, adding the first nickname to a nickname set for the selected token in the first set of tokens;
    at the data structure of the nickname module, searching for a second nickname corresponding to a selected token in the second set of tokens;
    at the computer processor of the nickname module, adding the second nickname to a nickname set for the selected token in the second set of tokens;
    at a computer processor of a token cross-multiplier module, cross-multiplying the first set of tokens with the nickname set for the selected token in the first set of tokens, thereby generating a first cross-multiplied token combination that includes each possible combination of the first set of tokens and the nickname set for the selected token in the first set of tokens;
    at the computer processor of the token cross-multiplier module, cross-multiplying the second set of tokens with the nickname set for the selected token in the second set of tokens, thereby generating a second cross-multiplied token combination that includes each possible combination of the second set of tokens and the nickname set for the selected token in the second set of tokens;
    at a computer processor of a token permutation module, generating a first permutation set from the first cross-multiplied token combination;
    at the computer processor of the token permutation module, generating a second permutation set from the second cross-multiplied token combination;
    at a computer processor of a string comparison module, comparing the first permutation set against the second permutation set; and
    outputting a name comparison score.

2. The method of claim 1, wherein generating the first permutation set further comprises:
    cyclically permuting the first cross-multiplied token combination, thereby resulting in a permutated element;
    concatenating the permutated element; and
    adding the concatenated permutated element to the first permutation set.

3. The method of claim 1, wherein generating the second permutation set further comprises concatenating elements of the second cross-multiplied token combination.

4. The method of claim 1, wherein generating the second permutation set further comprises:
    cyclically permuting the second cross-multiplied token combination, thereby resulting in a permutated element;
    concatenating the permutated element; and
    adding the concatenated permutated element to the second permutation set.

5. The method of claim 1, further comprising:
    at a computer processor of a token deduplication module, identifying any distinct tokens from the first set of tokens;
    at the computer processor of the token deduplication module, inserting the distinct tokens from the first set of tokens into a first distinct token set;
    at the computer processor of the token deduplication module, identifying any distinct tokens from the second set of tokens; and at the computer processor of the token deduplication module, inserting the distinct tokens from the second set of tokens into a second distinct token set.

6. The method of claim 1, further comprising merging the two contact records into a single contact record.

7. The method of claim 1, further comprising linking a selected first one of the two contact records to a selected second one of the two contact records.

8. The method of claim 1, wherein comparing the first permutation set against the second permutation set comprises calculating a minimum Levenshtein distance between members of the first permutation set and members of the second permutation set.

9. A system comprising a hardware device for providing a name comparison comprising:
   a name tokenizer module adapted to tokenize a received name;
   a token deduplication module adapted to identify a distinct token and add the distinct token to a distinct token set;
   a nickname module adapted to identify and return a nickname for the distinct token;
   a token cross-multiplier module adapted to:
      receive the distinct token set and the nickname and generate a cross product of the distinct token set and the nickname, the cross product comprising every possible combination of the tokens of the distinct token sets and nicknames for the tokens of the distinct token set;
   a token permutation module adapted to concatenate the cross product, thereby generating a first permutated string; and
   a string comparison module adapted to perform a string comparison between the first permutated string and a second permutated string.

10. The system of claim 9, wherein the token permutation module is further adapted to carry out a cyclic permutation of the cross product.

11. The system of claim 9, wherein the string comparison module is adapted to calculate an edit distance between the first permutated string and a second permutated string.

12. The system of claim 9, further comprising a computer processor device coupled to a memory storing computer-readable instructions, the computer processor capable of:
   tokenizing a first name and a second name, thereby generating a respective first and second set of tokens;
   generating a nickname set, the nickname set corresponding to a selected token of the first or second set of tokens;
   cross-multiplying the first set or the second set of tokens with the nickname set, thereby generating at least one cross-multiplied token combination;
   generating a first string representation of a selected one of the at least one cross-multiplied token combination and generating a second string representation;
   comparing the first string representation against the second string representation, thereby generating a name comparison score; and
   outputting the name comparison score.

13. The system of claim 9, where the nickname module comprises a vantage-point tree.

14. A computer-implemented method of comparing a two names, comprising:
   at a computer processor of a name tokenizer module, tokenizing the two names, thereby generating a first and second set of tokens;
   at a computer processor of a nickname module, generating a nickname set, the nickname set corresponding to a selected token of the first or second set of tokens;
   at a computer processor of a token cross-multiplier module, cross-multiplying the first set or the second set of tokens with the nickname set, thereby generating at least one cross-multiplied token combination including every possible combination of the tokens of the first and nicknames of the nickname set;
   generating a first string representation of a selected one of the at least one cross-multiplied token combination and generating a second string representation;
   at a computer processor of a string comparison module, comparing the first string representation against the second string representation, thereby generating a name comparison score; and
   outputting the name comparison score.

15. The method of claim 14, wherein generating the first string representation of the selected one of the at least one cross-multiplied token combination comprises:
   cyclically permuting the at least one cross-multiplied token combination, thereby resulting in a permutated element;
   concatenating the permutated element; and
   adding the concatenated permutated element to a permutation set.

16. The method of claim 14, wherein generating the second string representation further comprises concatenating elements of a second one of the at least one cross-multiplied token combination.

17. The method of claim 14, generating the second string representation further comprises:
   cyclically permuting a second one of the at least one cross-multiplied token combination, thereby resulting in a second permutated element;
   concatenating the second permutated element; and
   adding the concatenated second permutated element to a second permutation set.

18. The method of claim 14, further comprising:
   at a computer processor of a token deduplication module, identifying any distinct tokens from the first set of tokens;
   at the computer processor of the token deduplication module, inserting the distinct tokens from the first set of tokens into a first distinct token set;
   at the computer processor of the token deduplication module, identifying any distinct tokens from the second set of tokens; and
   at the computer processor of the token deduplication module, inserting the distinct tokens from the second set of tokens into a second distinct token set.

19. The method of claim 14, further comprising:
   selecting a first contact record corresponding to a first of the two names;
   selecting a second contact record corresponding to a second of the two names; and
   merging the first and second contact records into a single contact record.

20. The method of claim 14, further comprising:
   selecting a first contact record corresponding to a first of the two names;
   selecting a second contact record corresponding to a second of the two names; and
   linking the first and second contact records.

* * * * *